Sept. 3, 1957 R. J. WENTSEL 2,805,290
TAKE-UP REEL FOR ELECTRIC CORDS
Filed Feb. 4, 1954
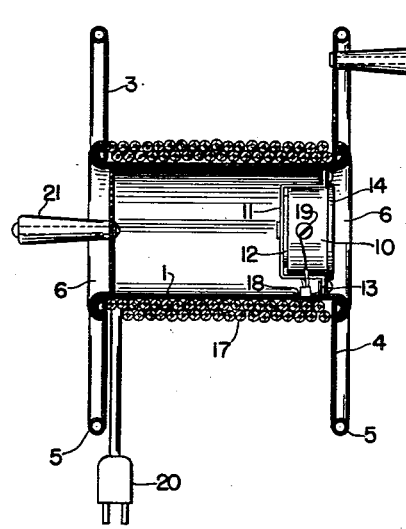
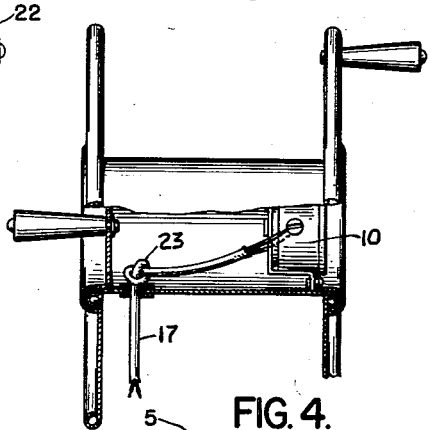
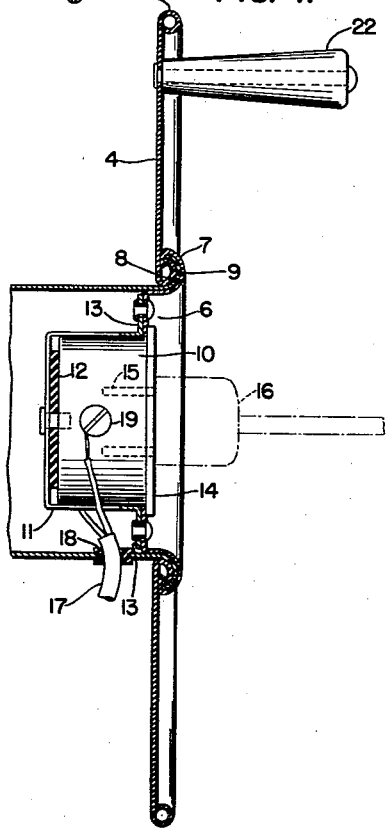
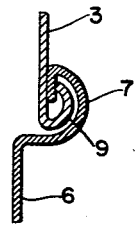
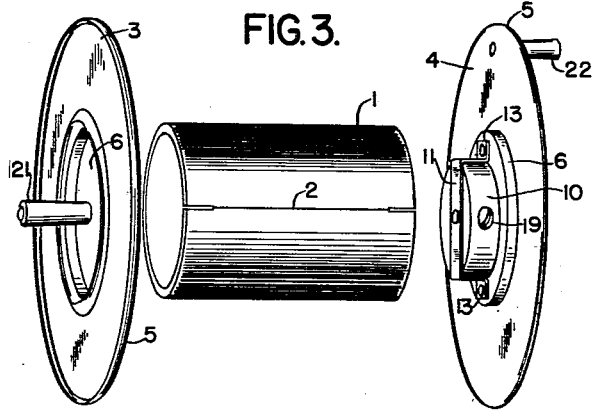
INVENTOR.
ROBERT J. WENTSEL
BY
Attorneys

United States Patent Office 2,805,290
Patented Sept. 3, 1957

2,805,290

TAKE-UP REEL FOR ELECTRIC CORDS

Robert J. Wentsel, Racine, Wis.

Application February 4, 1954, Serial No. 408,272

1 Claim. (Cl. 191—12.4)

This invention relates generally to a take-up reel and particularly to such a reel which is adapted for use in connection with various electrical appliances.

Quite often in the use of an electrical appliance of one sort or another it becomes necessary to utilize an additional length of electrical conductor cord to reach an electrical wall outlet. While this may be accomplished by employing the well-known extension cord, it is also recognized that in many instances a substantial length of the extension cord may not be required and the unused length of such a cord quite often creates an undesirable situation in that the surplus length of conductor is apt to kink or twist and generally is unwieldly to manipulate.

One object of this invention is to provide a reel and an electrical cord associated therewith whereby a predetermined length of cord may be utilized to bridge the distance between an electrical appliance whose cord may be too short to reach an electrical outlet.

Another object is to provide a reel for an electrical cord or the like and in which a plug on the end of an electrical cord which is associated with an apparatus such as a vacuum cleaner for instance, may be inserted into a receptacle built into the side of the reel so that the appliance may be used at a greater distance from a stationary electrical outlet than would ordinarily be possible due to the necessarily limited length of the cord which forms a part of the electrical appliance.

With the foregoing and other objects in view the invention consists briefly of the novel construction of a reel made from pressed sheet metal having an electrical receptacle secured to the center of one of the end plates of the reel, the outlet being disposed inwardly from the inner face of an end plate and within the hollow cylindrical hub portion of the reel so that the receptacle is protected at all times. One end of an electrical cord extends through the hub of the reel and is removably secured to the receptacle, the opposite end of the cord having a plug thereon for insertion into a stationary electrical outlet.

The drawing furnished herewith illustrates the best mode presently contemplated of carrying out the invention as set forth hereinafter.

In the drawing:

Figure 1 is a sectional view through the apparatus of the invention with parts in elevation and showing an electrical cord wound around the hub of the reel with one end thereof attached to an electrical receptacle disposed within the hub and the other end of the cord having a plug thereon depending from the reel;

Figure 2 is an enlarged detail view showing the initial assembly of cup 6 in one of the end plates such as end plate 3;

Fig. 3 is an exploded view of the reel of the invention with the cord removed;

Fig. 4 is an enlarged detailed view with parts in elevation of a portion of an end plate of the reel showing one manner of attaching an electrical receptacle to a hollow sheet metal cap disposed centrally of the end plate and showing an electrical plug in phantom disposed in the receptacle; and Fig. 5 is another view of the reel with parts in section.

With reference to the drawing the reel comprises a hollow cylindrical hub 1 made preferably of sheet metal with a longitudinal lock seam 2 and which is disposed between a pair of circular end plates 3 and 4 of substantially greater diameter. The end plates are formed in any suitable manner and may have radial strengthening ribs, not shown. The outer circular perimeters of end plates 3 and 4 are provided with beads 5 to strengthen the plates and eliminate sharp edges.

A circular blank is stamped from the center of each end plate to provide an aperture to receive a cup-shaped circular member 6 having a bottom surface inset from the end plates. The outer peripheral edge 7 of each cup member is beaded over the end 8 of hub 1 and the edge 9 that extends around the cup receiving opening of each end plate 3 and 4. The beaded point between edges 7 and 9 and the end 8 of hub 1 as illustrated in Figs. 2 and 4, secures the respective cup and plate and hub end together.

With particular reference to end plate 4 as best shown in Fig. 4, an electrical female receptacle 10 extends through cup 6 and is secured to the backside of cup 6 by a strap 11. The center portion of the strap member is riveted or otherwise secured centrally to the electrical receptacle there being suitable insulating means 12 disposed between the receptacle and the strap. The respective ends 13 of the strap are flanged to lie over the backside of cup 6 around the receptacle and are secured to cup 6 by rivets or the like. Receptacle 10 has a flange 14 on the outer end which abuts against the outside of cup 6.

The receptacle also is provided with a pair of elongated recesses to receive the prongs 15 of the plug 16 of the electrical device which is to be plugged into the reel of the invention.

One end of an electric cord 17 extends through an insulated aperture 18 in the hub adjacent the electrical receptacle 10 and is secured to binding posts 19 on each side of the receptacle while the balance of the cord may be wound around the hub member of the apparatus. The outer end of the cord is provided with an electric plug 20 which may be plugged into a wall socket or the like.

In using the apparatus of this invention one inserts the plug 20 into an electrical outlet which may be inside or outside of the house, garage or the like, then unwinds the desired amount of cord from the reel and then merely plugs the cord 16 of the electrically operated device into the centrally disposed receptacle 10 in the end plate 4. Only the length of electrical cord desired need be unwound from the reel the balance being retained on the hub of the reel. However, by utilizing the cord and reel of the invention an electrical appliance with a fixed length of cord can be used a considerable distance from a fixed electrical outlet by merely plugging into the reel.

In order to permit ready winding of the cord on the reel after it has been extended therefrom a handle 21 is secured to cup 6 of end plate 3 in axial alignment with receptacle 10 in the opposite cup 6 and a similar handle 22 is secured to end plate 4 near the outer periphery of the plate.

Fig. 5 illustrates the invention with the cord 17 entering the hub at a position opposite receptacle 10. A knot 23 is provided in the cord to strain relieve the same in the event the users inadvertently attempt to pull the cord 17 from the hub. Mechanical strain relief means may be substituted for the knot 23.

In assembling the cord and reel of the invention the hub 1 is rolled to cylindrical shape and is joined longitudinally by a lock seam 2 that is open at the ends as can be observed in Fig. 3 to permit beading of ends 8. The end plates 3 and 4 are formed to circular shape with beads 5 and are centrally blanked to receive cups 6, the edges 7 of which are beaded over the edges 9 of the plates 3 and 4, as illustrated in Fig. 2. Next the electric cord 17 is inserted through insulated aperture 18 of the hub and is secured to binding posts 19 on receptacle 10. The hub 2 is then assembled with plates 3 and 4 in a press and the parts are forced together with the split ends 8 of the hub being driven between beaded edges 7 and 9 of the cups 6 and plates 3 and 4 respectively, and likewise being beaded to securely join the hub, cups and end plates together. The cord 17 is then wound on the reel and the reel is ready for use as described above with any desired length of cord 17 being reeled off the same.

Various embodiments of the invention may be employed within the scope of the following claims.

I claim:

A take-up reel or spool for electric cords, comprising in combination a sheet metal cylindrical hub having the longitudinal end portions thereof slit, a pair of sheet metal end discs having beaded outer peripheries and a central opening in each approximating the diameter of said hub and adapted to receive a corresponding end portion of the hub, a sheet metal cup shaped member fitted in each end of said hub and having a rim folded outwardly and over a bead on the inner edge of the corresponding disc to interlock therewith, each end portion of said hub being expanded and confined between the corresponding folded rim of a cup member and bead of the disc to interlock the members rigidly together, an electrical outlet receptacle secured to one of said cup members and disposed within said hub and facing outwardly to receive the prongs of an appliance cord through an opening in the member, a handle extending axially outward of said other cup member, a handle extending outwardly from near the outer periphery of said disc at the end having said outlet, an electrical cord wound on said hub between said discs and having its inner end extending through an opening in the hub and connected to the terminals of said outlet and its other end provided with an electrical plug for insertion in a wall socket, said handles providing for the ready rotation of the entire reel as a body when gripped by the corresponding hands of an operator to either wind or unwind the cord on said hub.

References Cited in the file of this patent

UNITED STATES PATENTS

| | | |
|---|---|---|
| 914,772 | Williamson | Mar. 9, 1909 |
| 1,620,562 | Licht | Mar. 8, 1927 |
| 1,714,225 | Hyde et al. | May 21, 1929 |
| 1,730,104 | Wheat | Oct. 1, 1929 |
| 2,007,699 | Wiebking | July 9, 1935 |
| 2,070,561 | Cantor | Feb. 16, 1937 |
| 2,590,890 | Redo | Apr. 1, 1952 |

FOREIGN PATENTS

| | | |
|---|---|---|
| 561,634 | Germany | Oct. 17, 1932 |